DEFENSIVE PUBLICATION

UNITED STATES PATENT AND TRADEMARK OFFICE

Published at the request of the applicant or owner in accordance with the Notice of Dec. 16, 1969, 869 O.G. 657. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 9

T941,021

VOIDED FILMS

Carl Fraser Mathews and Christopher Deverell, Hitchin, Gordon Edmund Alfred Pears, Harpenden, Alan Duffield, Kimpton, and Peter George Knowles, Luton, England, assignors to Imperial Chemical Industries Limited, London, England Continuation of abandoned application Ser. No. 407,950, Oct. 19, 1973. This application Dec. 9, 1974, Ser. No. 531,000

Claims priority, application Great Britain, Feb. 9, 1973, 6,396/73

Int. Cl. G03c *1/78, 1/96*

U.S. Cl. 96—87 R

No Drawing. 18 Pages Specification

Opaque voided films having a total luminous transmission not exceeding 25% are made from blends of a polyester preferably polyethylene terephthalate, with 3 to 27% of an ethylene or propylene polymer, prepared by dry blending. The films are prepared by blending particles of the polyester and polymer, and then extruding the blend as a film, quenching, biaxially orienting the film and heat setting. The opacity is the result of voiding which occurs during the stretching operation. The voided film may be used as a base for photographic prints.